(12) United States Patent
Wu

(10) Patent No.: US 12,397,822 B2
(45) Date of Patent: Aug. 26, 2025

(54) SCENE SECURITY LEVEL DETERMINATION METHOD, DEVICE AND STORAGE MEDIUM

(71) Applicant: Beijing Tusen Weilai Technology Co., Ltd., Beijing (CN)

(72) Inventor: Nan Wu, Beijing (CN)

(73) Assignee: Beijing Tusen Weilal Technology Co., Ltd., Beijing (CN)

( * ) Notice: Subject to any disclaimer, the term of this patent is extended or adjusted under 35 U.S.C. 154(b) by 289 days.

(21) Appl. No.: 17/821,456

(22) Filed: Aug. 22, 2022

(65) Prior Publication Data
US 2023/0071836 A1 Mar. 9, 2023

(30) Foreign Application Priority Data
Aug. 31, 2021 (CN) .......................... 202111009842.X

(51) Int. Cl.
*B60W 40/02* (2006.01)
*B60W 60/00* (2020.01)

(52) U.S. Cl.
CPC ........ *B60W 60/0011* (2020.02); *B60W 40/02* (2013.01); *B60W 60/0015* (2020.02); *B60W 2556/10* (2020.02)

(58) Field of Classification Search
CPC ......... B60W 60/0011; B60W 60/0015; B60W 40/02; B60W 2556/10
(Continued)

(56) References Cited

U.S. PATENT DOCUMENTS

2013/0103296 A1* 4/2013 Koshizen ........... G01C 21/3691
701/119
2020/0056892 A1* 2/2020 Haque .................... G01C 21/28
(Continued)

FOREIGN PATENT DOCUMENTS

CN 110597711 A 12/2019
CN 110716529 A 1/2020
(Continued)

OTHER PUBLICATIONS

Gaël Kermarrec, Taking correlations into account: a diagonal correlation model, Sep. 6, 2017, GPS Solutions (Year: 2017).*
(Continued)

*Primary Examiner* — Matthias S Weisfeld
(74) *Attorney, Agent, or Firm* — Perkins Coie LLP

(57) ABSTRACT

The present application provides a scene security level determination method, relates to the technical field of autonomous driving, and is used for determining the security level of an unknown scene. The method comprises: determining, according to a first parameter set and a first parameter value set of the target scene, whether at least one predefined scene with a similarity between the at least one predefined scene and a target scene being larger than a set similarity threshold exists in a predefined scene library; selecting, in response to the at least one predefined scene existing, one predefined scene from the at least one predefined scene as a control scene; generating, according to the parameter subset of the control scene, a parameter value subset of the target scene; and determining, according to the parameter subset and the parameter value subset, a target security level of the target scene.

19 Claims, 5 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 2021/0009156 A1* | 1/2021 | Hu | ......................... | G06V 20/56 |
| 2022/0171401 A1* | 6/2022 | Usman | ................. | G05D 1/0221 |
| 2024/0005059 A1* | 1/2024 | Rajith | ..................... | G06F 30/20 |

FOREIGN PATENT DOCUMENTS

| | | | | |
|---|---|---|---|---|
| CN | 111401414 A | 7/2020 | | |
| WO | WO-2020052344 A1 * | 3/2020 | ............ | B60W 40/04 |
| WO | WO-2021061488 A1 * | 4/2021 | ........... | G05D 1/0027 |

OTHER PUBLICATIONS

European Search Report from corresponding EP Application No. 22191608 dated, Jan. 20, 2023.
Iso Technical Committee: "ISO/PAS 21448 Road vehicles—safety of the intended functionality", [Jan. 2019], (pp. 1-54), XP055930221.
Redmaier, et al: "Survey on Scenario-Based Safety Assessment of Automated Vehicles", IEEE Access, IEEE, USA, vol. 8, [May 2020], (pp. 87456-87477), XP011789435.

* cited by examiner

Example: area range at the beginningTarget area range

SCENE SECURITY LEVEL DETERMINATION METHOD, DEVICE AND STORAGE MEDIUM

CROSS-REFERENCE TO RELATED APPLICATION(S)

The present disclosure claims priority to Chinese Patent Application No. 202111009842.X, titled "SCENE SECURITY LEVEL DETERMINATION METHOD, APPARATUS AND DEVICE AND STORAGE MEDIUM," filed on Aug. 31, 2021, the content of which is incorporated herein by reference in its entirety.

TECHNICAL FIELD

The present application relates to the technical field of autonomous driving, and provides a scene security level determination method, apparatus and device and a storage medium.

BACKGROUND

At present, in order to guarantee traffic security and personal safety of drivers, most vehicles on the market have certain driving requirements, so that many people cannot drive the vehicles because they cannot meet driving requirements, and thus the transportation travel of people is influenced.

In view of the above problem, along with the gradual development of the automobile industry, autonomous vehicles (AVs) have come into being, and by virtue of the advantages of being capable of adapting to more people, alleviating traffic jams, improving road security and the like, the application of AVs has gradually become a development trend of the future automobile industry. However, the autonomous vehicles also have certain technical development requirements and need to have the capabilities of autonomous driving, degraded driving, stopping running, being manually taken over or remotely intervened in the scenes where vehicles cannot autonomously process, and the like on the premise of ensuring security in any service scene. However, since the autonomous driving scene has the characteristics of uncertainty, unpredictability, inexhaustibility and the like, the service scenes recorded by the autonomous vehicle are limited, and thus, when the autonomous vehicles face an unknown scene, the risk that the security level of the unknown scene cannot be quickly identified may exist, so that the problems that the traffic security cannot be guaranteed and the like occur.

Therefore, how to quickly determine the security level of an unknown scene is an urgent problem to be solved.

SUMMARY

The embodiment of the present application provides a scene security level determination method, apparatus and device and a storage medium which are used for rapidly determining the security level of an unknown scene.

In one aspect, provided is a scene security level determination method, which comprises:
  determining, according to a first parameter set and a first parameter value set of a target scene where a target vehicle is located, whether at least one predefined scene exists in a predefined scene library, wherein a similarity between the at least one predefined scene and the target scene being larger than a set similarity threshold; wherein the first parameter set includes parameters whose values have been acquired for the target scene, and the first parameter value set includes parameter values which correspond to the parameters of the first parameter set;
  selecting, in response to the at least one predefined scene existing, one predefined scene from the at least one predefined scene as a control scene; wherein there is a parameter subset of the control scene, and the parameter subset of the control scene is a subset of the first parameter set of the target scene;
  generating, according to the parameter subset of the control scene, a parameter value subset of the target scene; wherein parameter values of the parameter value subset of the target scene correspond to parameters of the parameter subset of the control scene, and the parameter value subset of the target scene is a subset of the first parameter value set; and
  determining, according to the parameter subset of the control scene and the parameter value subset of the target scene, a target security level of the target scene.

In one aspect, provided is a scene security level determination apparatus, which comprises:
  a similar scene determination unit, configured for determining, according to a first parameter set and a first parameter value set of a target scene where a target vehicle is located, whether at least one predefined scene exists in a predefined scene library, wherein a similarity between the at least one predefined scene and the target scene being larger than a set similarity threshold; wherein the first parameter set includes parameters whose values have been acquired for the target scene, and the first parameter value set includes parameter values which correspond to the parameters of the first parameter set;
  a control scene determination unit, configured for selecting, in response to the at least one predefined scene existing, one predefined scene from the at least one predefined scene as a control scene; wherein there is a parameter subset of the control scene, and the parameter subset of the control scene is a subset of the first parameter set of the target scene;
  a parameter value subset generation unit, configured for generating, according to the parameter subset of the control scene, a parameter value subset of the target scene; wherein parameter values of the parameter value subset of the target scene correspond to parameters of the parameter subset of the control scene, and the parameter value subset of the target scene is a subset of the first parameter value set; and
  a security level determination unit, configured for determining, according to the parameter subset of the control scene and the parameter value subset of the target scene, a target security level of the target scene.

In one aspect, provided is a computer device, which comprises a memory, a processor and a computer program stored on the memory and executable on the processor, wherein the processor, when executing the computer program, implements steps of the method of the above aspect.

In one aspect, provided is a computer storage medium having a computer program instruction stored thereon, wherein the computer program instruction, when executed by a processor, implements steps of the method of the above aspect.

In the embodiment of the present application, whether at least one predefined scene with a similarity between the predefined scene and a target scene being larger than a set similarity threshold exists in a predefined scene library can be determined according to a first parameter set and a first parameter value set of the target scene where a target vehicle is located, and thus, when at least one predefined scene exists, one predefined scene is selected from the at least one predefined scene as a control scene in response to the at least one predefined scene existing, and the parameter subset of the control scene comprises key parameters which affect the security of the control scene; furthermore, a parameter value subset may be generated according to the parameter subset and the first parameter value set, so that a target security level of the target scene may be determined according to the parameter subset and the parameter value subset. Therefore, in the embodiment of the present application, the target security level of the target scene is determined by acquiring the similar scene from the predefined scene library and further acquiring the control scene from the similar scene, so that the security level of the target scene can be directly determined according to the security level range corresponding to the control scene, the determination time of the security level of the target scene is greatly shortened, and a coping strategy can be rapidly adopted for an unknown scene. In addition, since the parameter subset is a subset of the first parameter set and does not comprise all parameters in the first parameter set, when the scene security level of the target scene is determined, the calculation amount can be reduced, the processing efficiency can be improved, the determination time of the security level of the target scene can be further shortened, and the security performance of the autonomous vehicle can be further improved.

BRIEF DESCRIPTION OF THE DRAWINGS

In order to more clearly illustrate embodiments of the present application or the technical solutions in related arts, the drawings required for use in the embodiments or in related arts will be briefly described below. It is obvious that the drawings in the description below are only some embodiments of the present application, and other drawings can be derived from these drawings by those of ordinary skills in the art without making creative efforts.

DETAILED DESCRIPTION

Figure 1:
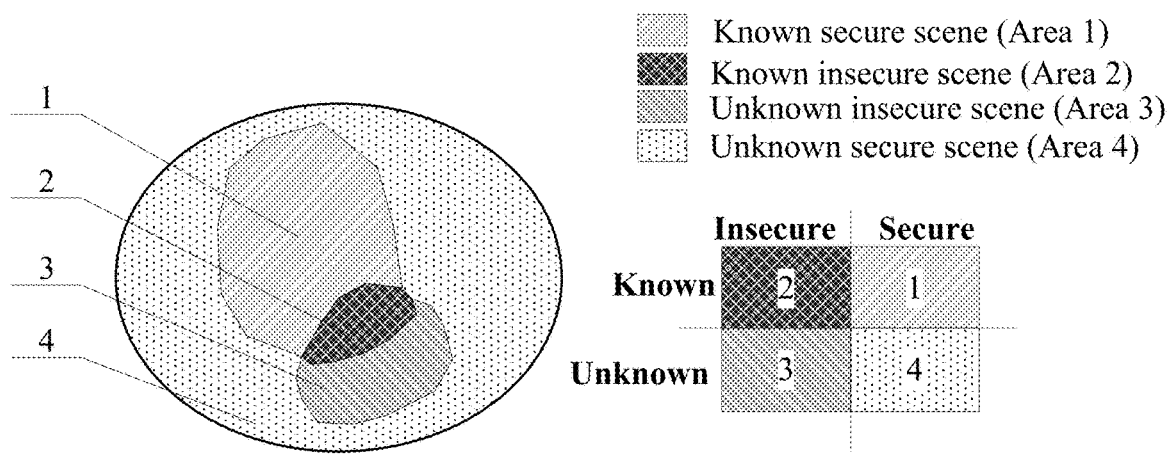
FIG. 1 is a schematic diagram of a division scene provided in an embodiment of the present application.

In order to make the objects, technical solutions and advantages of the present application more clearly understood, the technical solutions in the embodiments of the present application will be clearly and completely described below with reference to the drawings in the embodiments of the present application. Obviously, the described embodiments are only a part of the embodiments of the present application, rather than all the embodiments. Based on the embodiments in present application, all other embodiments obtained by those of ordinary skill in the art without creative work shall fall within the protection scope of the present application. The embodiments and features thereof in the present application may be combined with one another without conflict. In addition, while a logical order is shown in the flow chart, in some cases, the steps shown or described may be performed in an order different than here.

Firstly, some terms in the present application will be explained.

(1) The autonomous vehicle, also called as an unmanned automobile, a computer driving automobile or a wheeled mobile robot, is an intelligent automobile which can realize unmanned driving through a computer system. Depending on the cooperation among artificial intelligence, computer vision, radar, monitoring apparatus and global positioning system, an autonomous vehicle can enable a computer to automatically and safely operate the motor-driven vehicle to move without any active operation of human.

(2) The unmanned rating includes 6 unmanned ratings defined by Society of Automotive Engineers (SAE) which are divided into rating 0 (fully manual) to rating 5 (fully autonomous).

(3) The scene refers to a combination of a driving occasion and a driving scene, and is deeply influenced by driving environments such as roads, traffic, weather and lighting, all of which form a whole scene concept. The scene is a comprehensive reflection of the environment and the driving behavior in a certain time and space range, and describes external states such as roads, traffic facilities, meteorological conditions and traffic participants and information such as driving tasks and states of the own vehicle.

(4) The scene quantitative classification description method is a method for defining a scene by adopting key parameters corresponding to each scene element based on the scene elements.

The scene elements can be divided into traffic participants (objects), road conditions, environments, behaviors, and the like. Traffic participants may refer to other people or vehicles present in the scene, as well as other objects or animals that influence driving decisions or that may move autonomously; road conditions may refer to characteristics of roads and characteristics of traffic control; environments may refer to all possible changing environmental factors; behaviors may refer to the driving behavior of the autonomous vehicle itself.

For the traffic participants, the corresponding key parameters may include object type, object moving speed, object moving direction, object acceleration, object number, environmental awareness, and the like. The object type may include passenger cars, heavy trucks, pedestrians, street lamps, dustbins, signposts and the like; the object moving speed may include static state, low-speed moving and high-speed moving; the object moving direction may include straight moving, backing up, U-turns, left turning, right turning, arc-shaped moving, out-of-lane and into-the-lane; the object acceleration may include accelerating, slowing down and uniform speed; the environmental awareness may mean for a living object, the autonomous vehicle also need to determine whether this object carefully watches the road or not, for example, a drunk driver, a 5-year-old child, and a young person walking and checking his phone.

For the road conditions, the corresponding key parameters may include intersection design, traffic control mode, the number of lanes, lane line, lane type, speed limit, road type, road angle, area, and the like. The intersection design may include crossroads, T-shaped intersections and Y-shaped intersections; the traffic control mode may include traffic light patterns, stop boards and avoidance boards; the number of lanes may include single lanes and 4 lanes; the lane line may include dividing lines and no dividing lines, the lane type may include bicycle lanes, bus lanes and overtaking lanes; the speed limit may include 25 mph, the speed limit of commercial areas and the speed limit of residential areas; the road type may include high speed, common roads and paths; the road angle may include uphill slopes, downhill slopes and jolts; the area may include logistics hubs, school districts, hospital areas, mountainous areas, construction areas and the like.

For the environment, the corresponding key parameters may include weather, lighting, road surface, signal, etc., wherein, the weather may include rainfall, wind speed, temperature and visibility; the illumination may include cloudy day, sunrise and sunset time, and sunshine angle; the road surface may include icing, ponding and construction; the signal may include signal intensity, etc.

Currently, for the characteristics of uncertainty, unpredictability, inexhaustibility and the like of an autonomous driving scene, a new standard, namely the safety of the intended functionality (SOTIF) standard, is proposed by the International Organization for Standardization (ISO); the SOTIF standard belongs to ISO/PAS 21448: Road Vehicles, wherein the ISO/PAS 21448 standard is applicable to functions requiring proper environmental awareness and concerns how to ensure the security of the target function without vehicle failure, which is in sharp contrast to conventional functional security (concerns how to reduce security risks due to system failure).

Based on the SOTIF standard, for the autonomous driving scene, FIG. 1 shows a schematic diagram of division scenes provided in the embodiment of the present application, wherein any scene may be divided into four categories as shown in FIG. 1, namely, a known secure scene (Area 1), a known insecure scene (Area 2), an unknown insecure scene (Area 3), and an unknown secure scene (Area 4).

Figure 2:
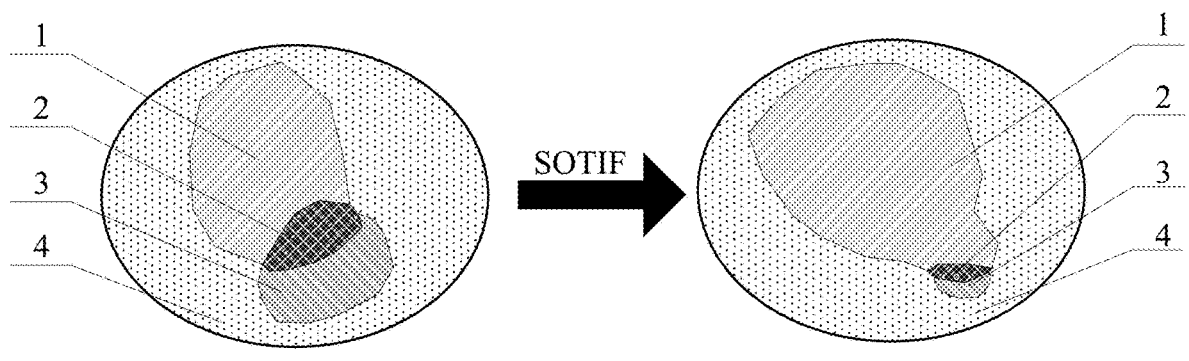
FIG. 2 is a schematic diagram of the reduction in insecure scenes provided in an embodiment of the present application.

The goal of the SOTIF standard is to evaluate the two types of insecure scenes, Area 2 and Area 3, and further, FIG. 2 shows a schematic diagram of the reduction in insecure scenes provided in an embodiment of the present application, wherein the areas corresponding to these two types of insecure scenes, Area 2 and Area 3, may be reduced through a series of technical measures, and the evidence that these two areas are small enough to allow the remaining residual hazard to be accepted is provided. In addition, in the process, the area corresponding to Area 1 is usually increased because the areas corresponding to these two types of insecure scenes, Area 2 and Area 3, are reduced.

Furthermore, when Area 2 is evaluated, a risk scene with a risk in Area 2 can be identified through security analysis on Area 2, and then a coping strategy is developed for the risk scene, so that a real-time simulation environment is built or a real-vehicle test is designed according to the known scene, and the strategy is optimized according to an experiment result, and therefore the area corresponding to Area 2 is gradually reduced.

When Area 3 is evaluated, Area 3 can be specifically processed in two ways, wherein one way is to reduce the area occupied by Area 3 by improving the reliability of functions of vehicle systems and parts, and the other way is to reduce the area occupied by Area 3 by accumulating a large amount of data through a real-vehicle road test or a simulation test, in this way, the more data are accumulated, the more unknown scenes can be changed into known scenes.

However, since the autonomous driving scene has the characteristics of uncertainty, unpredictability, inexhaustibility and the like, the service scenes recorded by the autonomous vehicle are limited, and thus, when the autonomous vehicles face an unknown scene, the risk that the security level of the unknown scene cannot be quickly identified may exist, so that the problems that the traffic security cannot be guaranteed and the like occur.

Based on this, in the embodiment of the present application, whether at least one predefined scene with a similarity between the predefined scene and a target scene being larger than a set similarity threshold exists in a predefined scene library can be determined according to a first parameter set and a first parameter value set of the target scene where a target vehicle is located, and thus, when at least one predefined scene exists, one predefined scene is selected from the at least one predefined scene as a control scene in response to the at least one predefined scene existing, and the parameter subset of the control scene comprises key parameters which affect the security of the control scene; furthermore, a parameter value subset may be generated according to the parameter subset and the first parameter value set, so that a target security level of the target scene may be determined according to the parameter subset and the parameter value subset. Therefore, in the embodiment of the present application, the target security level of the target scene is determined by acquiring the similar scene from the predefined scene library and further acquiring the control scene from the similar scene, so that the security level of the target scene can be directly determined according to the security level range corresponding to the control scene, the determination time of the security level of the target scene is greatly shortened, and a coping strategy can be rapidly adopted for an unknown scene. In addition, since the parameter subset is a subset of the first parameter set and does not comprise all parameters in the first parameter set, when the scene security level of the target scene is determined, the calculation amount can be reduced, the processing efficiency can be improved, the determination time of the security level of the target scene can be further shortened, and the security performance of the autonomous vehicle can be further improved.

After the introduction of the design concept of the embodiment of the present application, some simple descriptions are provided below for application scenes to which the technical solution of the embodiment of the present application can be applied, and it should be noted that the application scenes described below are only used for describing the embodiment of the present application and are not limited. In the specific implementation process, the technical solution provided in the embodiment of the present application can be flexibly applied according to actual needs.

Figure 3:
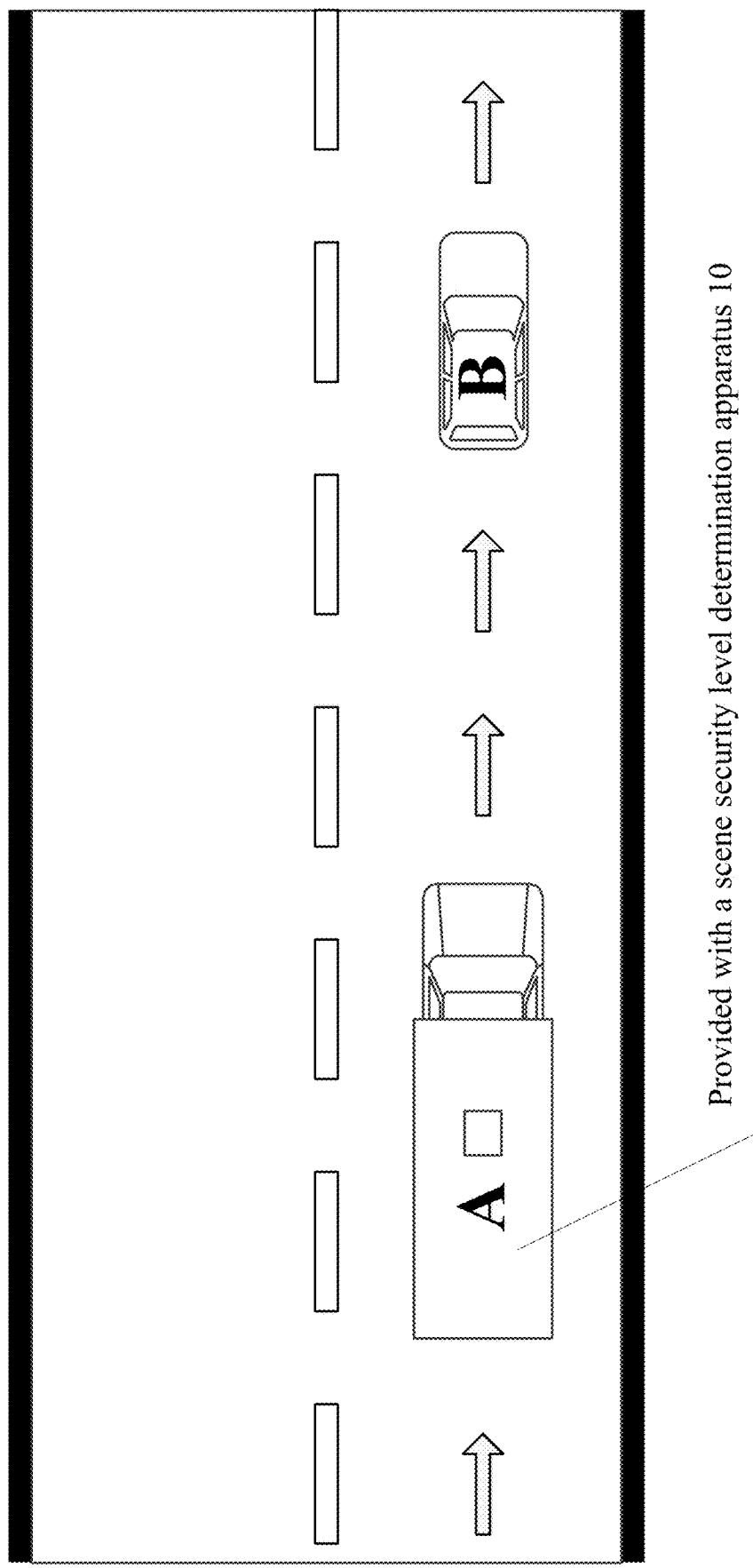
FIG. 3 is a schematic diagram of an application scene provided in an embodiment of the present application.

FIG. 3 shows a schematic diagram of an application scene provided in the embodiment of the present application, wherein the application scene with the scene security level determined may comprise a vehicle A and a vehicle B that are traveling on a road, wherein the vehicle A is provided with a scene security level determination apparatus 10.

In the embodiment of the present application, the scene security level determination apparatus 10 can be used to determine the security level of the scene in which the vehicle A is located. The scene security level can be set according to user requirements, for example, the scene security level may be set to 6 levels corresponding to the unmanned rating (rating 0-fully manual-rating 5-fully autonomous) in a one-to-one manner, and the higher the scene security level is, the securer the vehicle A is in an unknown scene.

The scene security level determination apparatus 10 specifically may be a vehicle-mounted computer or the like. In addition, the scene security level determination apparatus 10 may comprise one or more processors, memories, input/output (I/O) interfaces, and the like. The memory of the scene security level determination apparatus 10 may store program instructions of the scene security level determination method provided in the embodiment of the present application, wherein these program instructions, when executed by a processor, can be used to implement steps of the scene security level determination method provided in the embodiment of the present application.

In practical application, as shown in the scene of FIG. 3, a vehicle B which is located in the same lane and has the same driving direction as the vehicle A exists in front of the vehicle A along the driving direction of the vehicle A, when the vehicle A detects that the vehicle A is currently located in an unknown scene through a sensing system arranged in itself, the scene security level determination apparatus 10 of the vehicle A analyzes the unknown scene according to various parameters acquired by each sensor of the sensing system to quickly determine the scene security level of the unknown scene, so that the vehicle A can select a corresponding coping strategy to cope with according to the determined security level. For example, when the scene security level determination apparatus 10 determines that the security level of the unknown scene is level 1, that is, when the current unknown scene is an insecure scene, a driver may be notified to take over manually, or a background manager may perform remote intervention or the like to assist driving, so as to improve the driving security of the vehicle A.

Certainly, the method provided in the embodiment of the present application is not limited to the application scene shown in FIG. 3, and may also be used in other possible application scenes, and the embodiment of the present application is not limited thereto. Functions that can be implemented by each device of the application scene shown in FIG. 3 will be described together in the subsequent method embodiment, and will not be described in detail herein. Hereinafter, a method of the embodiment of the present application will be described with reference to the drawings.

Figure 4:
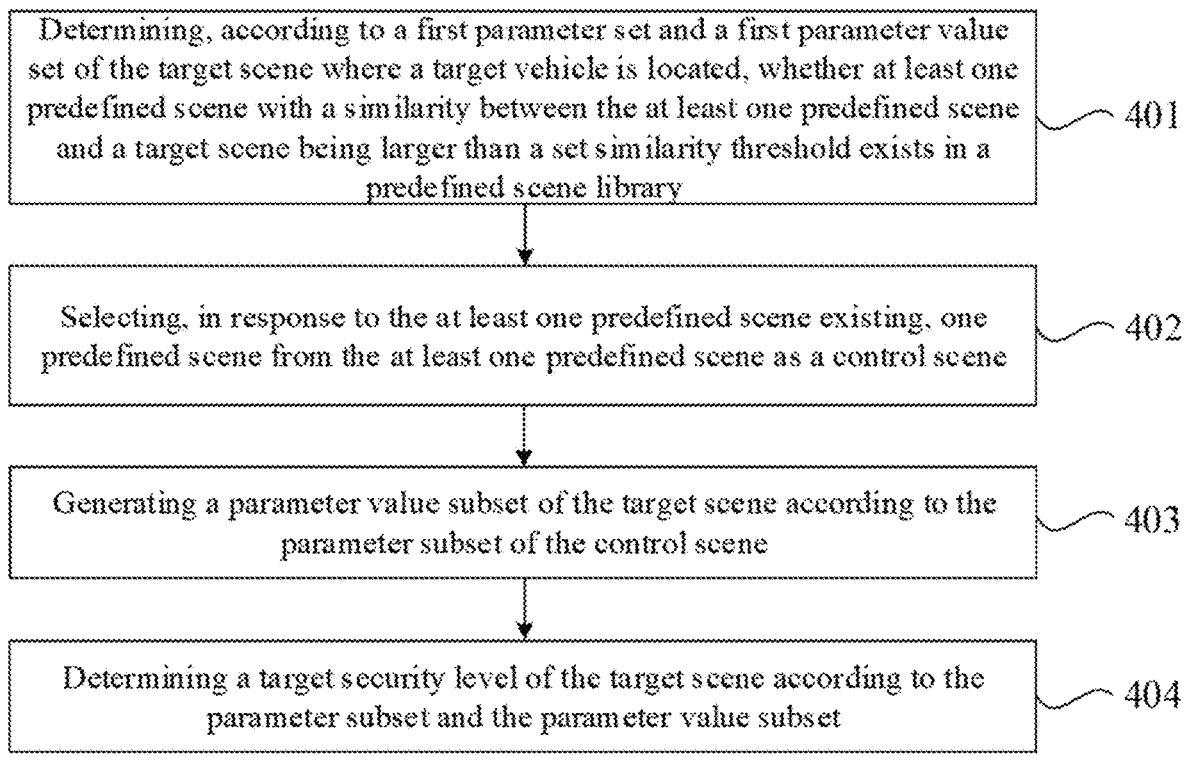
FIG. 4 is a flow chart of a scene security level determination method provided in an embodiment of the present application.

FIG. 4 shows a flow chart of a scene security level determination method provided in an embodiment of the present application, and the method may be executed by the scene security level determination apparatus 10 in FIG. 3, and a flowchart of the method is described as follows.

Step 401: determining, according to a first parameter set and a first parameter value set of the target scene where a target vehicle is located, whether at least one predefined scene with a similarity between the at least one predefined scene and a target scene being larger than a set similarity threshold exists in a predefined scene library.

In an embodiment of the present application, the parameter values of the first parameter value set correspond to the parameters of the first parameter set. The first parameter set include all parameters whose values have been acquired by the target vehicle for the target scene, including parameters whose parameter values are zero; in the predefined scene library, also included are a second parameter set, a second parameter value set, a parameter subset and a parameter value subset corresponding to each predefined scene, wherein the parameter subset is a subset of the second parameter set, and the parameters comprised in the parameter subset are key parameters with an importance degree corresponding to a driving security degree of the predefined scene being larger than a set importance degree threshold, that is, main parameters that can influence whether the corresponding predefined scene is secure or not, and the parameter values of the parameter value subset correspond to the parameters of the parameter subset.

In practical application, when a target vehicle is located in a target scene, the target vehicle acquires data of the target scene where the target vehicle is located through each sensor of the sensing system, and defines the target scene based on the acquired data through a scene quantitative classification description method. Therefore, in the embodiment of the present application, after data acquisition of a target scene, a first parameter set and a first parameter value set for defining the target scene may be generated based on the acquired data.

For example, the first parameter set may be $S_1$={self speed v1, self acceleration a1, lane where the target vehicle is located VL, lane where the preceding vehicle is located VL, inter-vehicle distance S, preceding vehicle speed v2, preceding vehicle acceleration a2, preceding vehicle type Veh, preceding vehicle moving direction Hd, road type RT, road speed limit RSL, road angle RA, number of lanes RLN, road visibility RV, wind speed WS, lighting condition LC, signal level SL, . . . }, and the first parameter value set is $N_1$={v1=60 km/h, a1=2 m/S, . . . , S=50 m, v2=55 km/h, a2=2 m/S, . . . }.

Therefore, in the embodiment of the present application, for the purpose of quickly determining the security level of the target scene, a predefined scene similar to the target scene may be selected from the predefined scene library for determination, and certainly, in order to further ensure that the selected predefined scene can be more matched with the target scene, when the similar predefined scene is selected, a similarity threshold may also be set, so that when the similarity between the target scene and the predefined scene is larger than the set similarity threshold, the security level of the target scene is determined based on the predefined scene with the similarity between the target scene and the predefined scene being larger than the set similarity threshold. The similarity between the target scene and the predefined scene can be determined by adopting a cosine similarity solution.

Therefore, in the embodiment of the present application, after the first parameter set and the first parameter value set of the target scene are determined, the similarity between the first parameter set of the target scene and the second parameter set of each predefined scene in the predefined scene library is determined, and then it is determined whether at least one predefined scene with the similarity between the predefined scene and the target scene being larger than the set similarity threshold exists in the predefined scene library, so that when at least one predefined scene with the similarity between the predefined scene and the target scene being larger than the set similarity threshold exists, the scene security level may be determined on the target scene through the at least one predefined scene.

Step 402: selecting, in response to the at least one predefined scene existing, one predefined scene from the at least one predefined scene as a control scene.

In the embodiment of the present application, the control scene has a parameter subset which is a subset of the first parameter set of the target scene. Of course, the control scene has a parameter subset which is also a subset of the first parameter set of the control scene.

In practical application, since there may be more than one predefined scene in the predefined scene library, whose similarity between the predefined scene and the target scene is larger than the set similarity threshold, when the scene security level of the target scene is determined based on the similar predefined scene, it is necessary to select one predefined scene from the determined at least one predefined scene as a control scene to determine the scene security level of the target scene. The control scene may be any one of the at least one predefined scene, and of course, in order to make the control scene and the target scene more matched, a predefined scene with the largest similarity in the at least one predefined scene may be selected as the control scene, in which case, a parameter subset of the control scene may be used as a parameter subset of the target scene, for example, the parameter subset of the control scene is A={self speed v1, self acceleration a1, inter-vehicle distance s, preceding vehicle speed v2, preceding vehicle acceleration a2}, and then the parameter subset of the target scene is also A={self speed v1, self acceleration a1, inter-vehicle distance s, preceding vehicle speed v2, preceding vehicle acceleration a2}.

Step 403: generating, according to the parameter subset of the control scene, a parameter value subset of the target scene.

In the embodiment of the present application, since the parameter subset of the target scene is the same as the parameter subset of the control scene, after the parameter subset of the control scene is determined, the parameter value subset of the target scene may be determined from the first parameter value set of the target scene according to the parameter subset of the control scene. In addition, the parameter values of the parameter value subset correspond to the parameters of the parameter subset, the parameter value subset being a subset of the first parameter value set.

Step 404: determining, according to the parameter subset and the parameter value subset, a target security level of the target scene.

In the embodiment of the present application, after the parameter subset and the parameter value subset of the target scene are determined, the value range of different security levels corresponding to each parameter in the parameter subset of the control scene may be determined as the value range of different security levels corresponding to each parameter in the parameter subset of the target scene, and then, the parameter security levels corresponding to each parameter in the parameter subset of the target scene may be determined according to the specific parameter values of the parameter value subset of the target scene, so as to synthesize the parameter security levels of each parameter and determine the target security level of the target scene.

For example, the parameter subset of the control scene is A={self speed v1, self acceleration a1, time to collision TTC, preceding vehicle speed v2, preceding vehicle acceleration a2}, and Table 1 shows value ranges of each parameter comprised in the parameter subset A at different security levels provided in the embodiment of the present application.

TABLE 1

|  | Level 1 (insecure) | Level 2 (to be noted) | Level 3 (secure) |
| --- | --- | --- | --- |
| Self speed v1 (km/h) | 120~340 | 60~120 | 0~60 |
| Self acceleration a1 (m/s$^2$) | 5~7.84 | 3~5 | 0~3 |
| Time to collision TTC (s) | 0~4 | 4~10 | 10~+∞ |
| Preceding vehicle speed v2 (km/h) | 0~20 | 20~60 | 60~340 |
| Preceding vehicle acceleration a2 (m/s$^2$) | −∞~6 | −3~6 | −3~+∞ |

When the parameter value subset of the target scene is A'={30, 2, 50, 100, 2.5}, it can be known from the value ranges of different security levels shown in Table 1 that the parameter security levels of self-speed v1, self-acceleration a1, time to collision TTC, preceding vehicle speed v2 and preceding vehicle acceleration a2 are all level 3, and therefore, by synthesizing the parameter security levels of the 5 parameters, it can be determined that the target security level of the target scene is level 3, that is, the current target scene is a secure scene.

In the embodiment of the present application, the scene security level corresponding to the target scene can be determined only when all parameters of the parameter subset of the target scene are at the same parameter security level, for example, when all parameters of the parameter subset are at level 1, the target security level of the target scene is level 1. In the parameter subset, if there is a parameter with a parameter security level different from that of other parameters, the scene security level of the target scene may be directly set to a preset scene security level, for example, directly set to the above level 1 (insecure) or level 2 (to be noted); or when the parameters belong to different security levels, respectively, the security level of the target scene is determined according to the lowest security level corresponding to the parameters, for example, the parameters of the parameter subset belong to level 2 and level 3, respectively, and at this time, level 2 is determined as the target security level of the target scene. Of course, the specific type of scene security level can be set according to user requirements.

Figure 5:
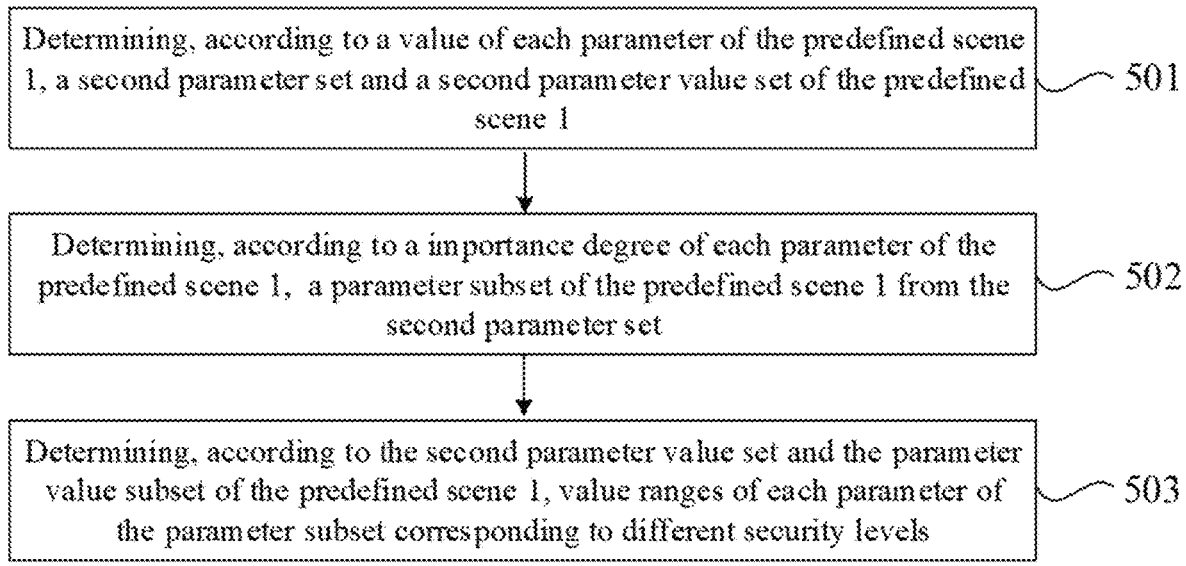
FIG. 5 is a flow chart of a process of determining a parameter set and a parameter value set of a predefined scene.

In a possible embodiment, since a similar predefined scene needs to be selected from the predefined scene library to determine the scene security level of the target scene, in the embodiment of the present application, the predefined scene library also needs to be constructed. Since in the predefined scene library, also included are a second parameter set, a second parameter value set, a parameter subset and a parameter value subset corresponding to each predefined scene, the second parameter set, the second parameter value set, the parameter subset and the parameter value subset corresponding to each predefined scene need to be determined during the construction of the predefined scene library. In the embodiment of the present application, since the process of determining the second parameter set, the second parameter value set, the parameter subset and the parameter value subset corresponding to each predefined scene is the same, the determination process of a predefined scene 1 is taken as an example here to be described. FIG. 5 shows a flow chart of the determination of the parameter set and the parameter value set of the predefined scene provided in the embodiment of the present application, and the method may be executed by the scene security level determination apparatus 10 in FIG. 3, and the specific process is described as follows.

Step 501: determining, according to a value of each parameter of the predefined scene 1, a second parameter set, and a second parameter value set of the predefined scene 1.

In the embodiment of the present application, when a vehicle is located in the predefined scene 1, data of the predefined scene 1 may be acquired through each sensor of the sensing system, and similarly, the predefined scene 1 may be defined based on the data acquired from the predefined scene 1 according to a scene quantitative classification description method, so that a second parameter set and a second parameter value set corresponding to the predefined scene 1 may be determined. The parameters comprised in the second parameter value set are all parameters of parameter values acquired for the predefined scene 1, including parameters whose parameter values are zero, and the parameter values of the second parameter value set correspond to the parameters of the second parameter set.

Step 502: determining, according to the importance degree of the each parameter of the predefined scene 1, a parameter subset of the predefined scene 1 from the second parameter set.

In practical application, after the second parameter set of the predefined scene 1 is determined, the importance degree of the scene security level may be determined according to the each parameter of the predefined scene 1, for example, the predefined scene 1 is a scene shown in FIG. 3, wherein a vehicle B which is located in the same lane and has the same driving direction as the vehicle A exists in front of the vehicle A along the driving direction of the vehicle A, and in the predefined scene 1, a collision between the vehicle A and the vehicle B is likely to occur, and therefore, for the predefined scene 1, the self-speed v1, the self-acceleration a1, the preceding vehicle speed v2, the preceding vehicle acceleration a2, the distance s between these two vehicles and the time to collision TTC are main parameters which affect whether the predefined scene 1 is secure, so that, the self-speed v1, the self-acceleration a1, the preceding vehicle speed v2, the preceding vehicle acceleration a2, the distance s between these two vehicles and the time to collision TTC have a big importance degree to the predefined scene 1. Therefore, the parameter subset B={v1, a1, v2, a2, s, TTC} of the predefined scene 1 is determined from the second parameter set.

Furthermore, since the parameter values of the second parameter value set correspond to the parameters of the second parameter set, the parameter value subset corresponding to the parameter subset can be determined from the second parameter value set according to the parameter subset of the predefined scene 1.

Step 503: determining, according to the second parameter value subset of the predefined scene 1, value ranges of each parameter of the parameter subset corresponding to different security levels.

In the embodiment of the present application, since the scene security level of the predefined scene 1 is known, according to the scene security level of the predefined scene 1 and the second parameter value set and the parameter value subset of the predefined scene 1, the value range of each parameter of the parameter subset of the predefined scene 1 corresponding to different security levels can be determined.

In one possible embodiment, during practical application, parameters may be divided into unicity parameters and non-unicity parameters, wherein the parameter value of each of the non-unicity parameters has a correlation with the parameter value of at least one parameter of the parameter subset, for example, as shown in the scene of FIG. 3, a vehicle B which is located in the same lane and has the same driving direction as the vehicle A exists in front of the vehicle A along the driving direction of the vehicle A, and if the distance s between the vehicle A and the vehicle B is larger than a certain value, the self-speed v1 and the preceding vehicle speed v2 can be classified into the secure level regardless of the values of the self-speed v1 and the preceding vehicle speed v2 for the vehicle A. That is, for 2 parameters with strong correlation, if the security level of one parameter affects the security level of another parameter, such as, when one of the parameters meets a certain condition, the other parameter can be classified into the same category (secure/insecure/to be noted) no matter how the other parameter changes, and then the 2 parameters with strong correlation can be called non-unicity parameters.

Figure 6:
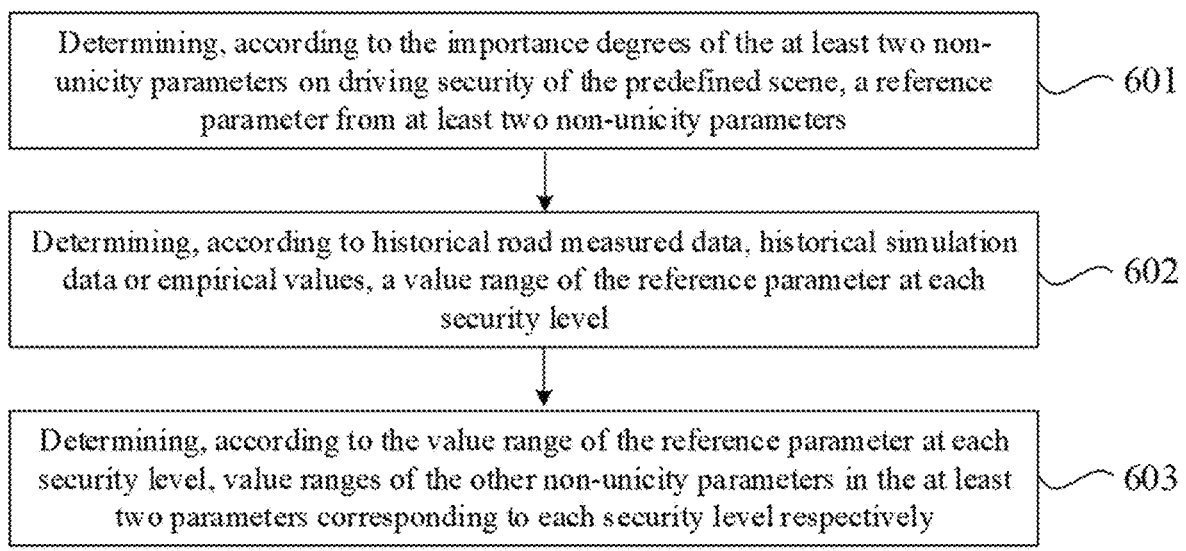
FIG. 6 is a flow chart of a process of determining a value range of security levels provided in an embodiment of the present application.

FIG. 6 shows a flow chart of a process of determining a value range of security levels provided in an embodiment of the present application, wherein the method may be executed by the scene security level determination apparatus 10 in FIG. 3, and the specific process is described as follows.

Step 601: determining, according to importance degrees of the at least two non-unicity parameters on driving security of the predefined scene, a reference parameter from at least two non-unicity parameters.

Since the non-unicity parameters influence each other, for example, among the 3 non-unicity parameters, the inter-vehicle distance s, the self-speed v1 and the preceding vehicle speed v2, since the security level of the inter-vehicle distance s influences the security levels of the self-speed v1 and the preceding vehicle speed v2, that is, the security level of the inter-vehicle distance s determines the security levels of the self-speed v1 and the preceding vehicle speed v2, when the value ranges of the security levels of the non-unicity parameters are determined, the determination may be performed in stages, and as in the above example, the value ranges of the security levels of the inter-vehicle distance s may be determined first, and then the value ranges of the security levels of the self speed v1 and the preceding vehicle speed v2 may be determined based on the value ranges of the security level of the inter-vehicle distance s.

Therefore, in the embodiment of the present application, a reference parameter may be determined from at least two non-unicity parameters according to the importance degree of the at least two non-unicity parameters on the driving security of the predefined scene. For example, since the importance degree of the three non-unicity parameters, namely the inter-vehicle distance s, the self speed v1 and the preceding vehicle speed v2 described above, is s>v1>v2 according to the importance degree of the speed v1, the speed v2 and the distance s on the driving security of the predefined scene, the distance s may be determined as a reference parameter.

Step 602: determining, according to historical road measured data, historical simulation data or empirical values, a value range of the reference parameter at each security level.

In the embodiment of the present application, since the scene security level of the predefined scene 1 is known, the value range of the reference parameter at each security level may be determined according to historical road measured data, historical simulation data or empirical values. For example, as for the non-unicity parameter inter-vehicle distance s, it is known from experience that if the scene security level of the predefined scene 1 is level 3 (secure), the value range of the inter-vehicle distance s is [1 km, +∞], and then the value range of the inter-vehicle distance s is [1 km, +∞] if the parameter security level is level 3 (secure).

Step 603: determining, according to the value range of the reference parameter corresponding to each security level, value ranges of the other non-unicity parameters in the at least two parameters corresponding to each security level respectively.

Furthermore, after the value range of the reference parameter corresponding to each security level is determined, the value range(s) of the other non-unicity parameter(s) corresponding to each security level can be determined respectively according to the value range of the reference parameters at each security level.

For example, Table 2 shows the value ranges of the non-unicity parameters at different security levels provided in the embodiment of the present application, and continuing with the above example, when the parameter security level of the inter-vehicle distance s is level 3 (secure), that is, when the value range is [1 km, +∞] for the vehicle A, since the self-speed v1 and the preceding vehicle speed v2 can be classified into level 3 (secure) regardless of the values of the self-speed v1 and the preceding vehicle speed v2, the value range of the self-speed v1 at level 3 (secure) can be determined to be arbitrary values according to the value range [1 km, +∞] of the inter-vehicle distance s at level 3 (secure), and similarly, the value range of the preceding vehicle speed v2 at level 3 (secure) can be determined to be arbitrary values.

TABLE 2

|  | Level 1 (insecure) | Level 2 (to be noted) | Level 3 (secure) |
| --- | --- | --- | --- |
| Inter-vehicle distance (km) | 0~0.1 | 0.1~1 | 1~+∞ |
| Self speed v1 (km/h) | 120~340 | 60~120 | Arbitrary value |
| Preceding vehicle speed v2 (km/h) | 0~20 | 20~60 | Arbitrary value |

Of course, for the unicity parameters, the value range of each unicity parameter at each security level may be determined directly according to the historical road measured data, the historical simulation data or empirical values.

In one possible embodiment, the parameter subset of the predefined scene may be determined in the following 2 ways.

(1) The parameter subset of the predefined scene may be determined from the second parameter set according to the first importance degree corresponding to each parameter of the predefined scene.

In the embodiment of the present application, the first importance degree may be determined according to historical road measured data or historical simulation data.

In practical application, the performance of the vehicle during autonomous driving in a road test can be determined through a real-vehicle road test or a simulation test, for example, in the predefined scene, according to the performance of the vehicle under different parameter values, such as, whether a vehicle needs to be manually taken over, whether a vehicle has a traffic accident or whether a simulation result achieves an expected effect, and the like, so as to further determine a parameter subset having the greatest influence on the definition of the security of the predefined scene and parameter values (or parameter variation ranges and variation rates) corresponding to each key parameter of the parameter subset. Of course, the parameter subset and the variation ranges or the variation rate of each key parameter comprised in the parameter subset may also be continuously optimized according to the result obtained by continuously performing the real-vehicle road test or simulation, to obtain the optimal parameter subset. Or a parameter set policy with a relatively high pertinence is formed for different application scenes.

(2) The parameter subset of the predefined scene may be determined from the second parameter set according to the second importance degree corresponding to each parameter of the predefined scene.

In the embodiment of the present application, the second importance degree may be set according to an empirical value.

In practical application, the parameter subset of the scene which cannot be easily obtained through a real-vehicle road test or simulation can be determined in a forward scene analysis mode. That is, for a specific scene, for example, for a road scene in snowy days, a road scene in foggy days, etc., the key parameter analysis may be performed on the scene according to the empirical value, so as to further determine a parameter subset having the greatest influence on the definition of the security of the predefined scene and parameter values corresponding to each key parameter of the parameter subset.

For the scene shown in FIG. 3, the key parameters used for defining other scenes, such as the number of lanes, lane line type, road type, road angle and the signal level, have a slight effect on the security of the scene shown in FIG. 3, and therefore, it can be determined empirically that these parameters are not the key parameters of the scene shown in FIG. 3. In addition, specific environmental parameters, such as weather and lighting, can be uniformly set according to the system processing capacity.

In one possible embodiment, the parameter subset of the predefined scene may also be determined in the following method.

First, a first parameter subset may be determined from the second parameter set according to the first importance degree corresponding to each parameter of the predefined scene. Then, the parameter subset of the predefined scene is determined from the first parameter subset according to the second importance degree corresponding to each parameter of the first parameter subset. This method integrates the two modes of determining the parameter subset according to the historical road measured data and the historical simulation test data and determining the parameter subset according to the empirical value, so that the determined parameter subset is more accurate, and the security level of the predefined scene can be influenced.

In a possible embodiment, when the control scene is determined, since the similarity threshold is set to make the selected similar scene more matched with the target scene, only the predefined scene with the similarity larger than the set similarity threshold may be selected as the control scene. Therefore, when the similarity between the target scene and the predefined scene is calculated, another situation may also occur, that is, there is no predefined scene with the similarity between the predefined scene and the target scene being larger than the set similarity threshold in the predefined scene library, at this time, in order to improve the security of the vehicle, the preset security level may be directly determined as the target security level of the target scene, and a corresponding subsequent processing mode may be set. For example, the security level of the target scene may be directly determined as level 1 (insecure) or level 2 (to be noted). Of course, the specific type of scene security level can be set according to user requirements.

In addition, to be able to identify the target scene subsequently, in this embodiment of the present application, the target scene may be added to the predefined scene library, and a second parameter set, a second parameter value set, a parameter subset and a parameter value subset of the target scene may be determined in combination with the step of "constructing the predefined scene library."

In summary, in the embodiment of the present application, the target security level of the target scene is determined by acquiring the similar scene(s) from the predefined scene library and further acquiring the control scene from the similar scene(s), so that the security level of the target scene can be directly determined according to the security level range corresponding to the control scene, the determination time of the security level of the target scene is greatly shortened, and a coping strategy can be rapidly adopted for an unknown scene, thereby improving the security performance of the autonomous vehicle. Meanwhile, since the parameter subset is a subset of the first parameter set and does not comprise all parameters in the first parameter set, when the scene security level of the target scene is determined, the calculation amount can be reduced, the processing efficiency can be improved, the determination time of the security level of the target scene can be further shortened, and the security performance of the autonomous vehicle can be further improved. Furthermore, it can be seen that the method presented in the present application is not limited to determining whether a known scene is secure, but also has corresponding criteria and capabilities for determining whether an unknown scene or an extension scene of a known scene is security.

In addition, according to the method described in the embodiment of the present application, after the security level of the current target scene is quickly determined, a subsequent processing mode may be further configured, for example, when the security level of the target scene is relatively high, no additional processing is needed, or the control parameters of the autonomous driving system are correspondingly adjusted to improve the security level; when the security level of the target scene is relatively low, prompt information can be sent to personnel on the vehicle or a background manager through the autonomous driving system so as to prompt manual taking over, and finally the real-time scene coping capability of the autonomous vehicle is improved.

Figure 7:
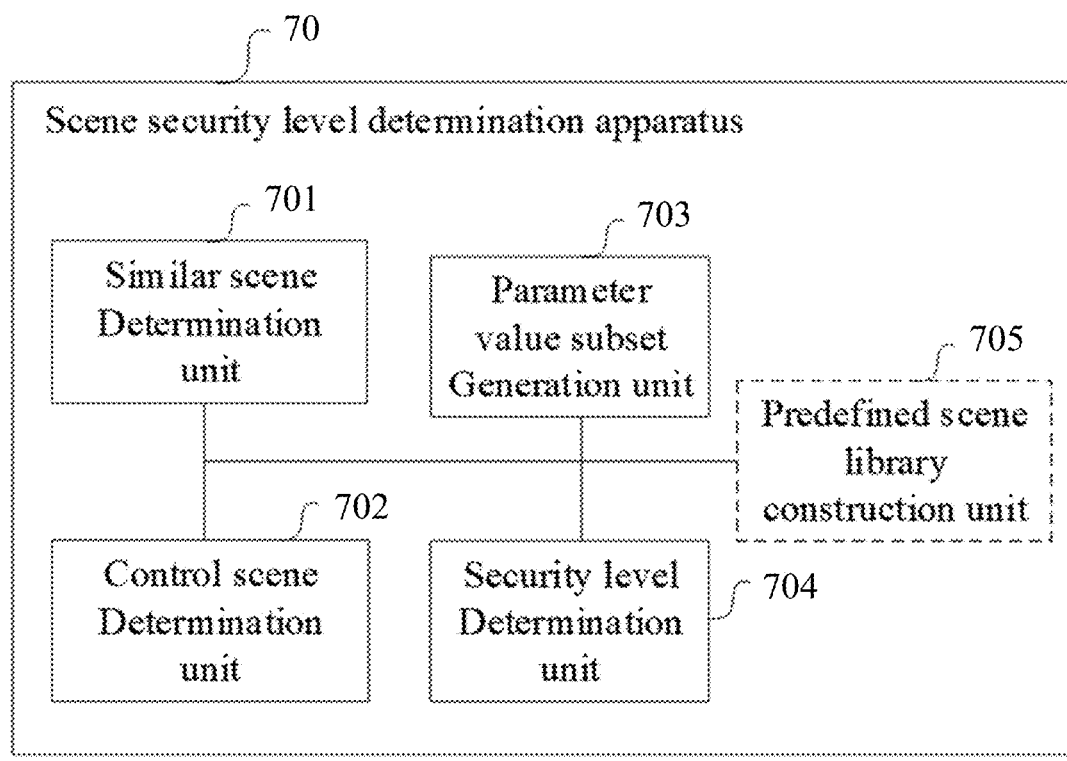
FIG. 7 is a schematic structural diagram of a scene security level determination apparatus provided in an embodiment of the present application.

As shown in FIG. 7, based on the same inventive concept, the embodiment of the present application provides a scene security level determination apparatus 70, which comprises:
- a similar scene determination unit 701, configured for determining whether at least one predefined scene with a similarity between the predefined scene and a target scene being larger than a set similarity threshold exists in a predefined scene library according to a first parameter set and a first parameter value set of the target scene where a target vehicle is located, wherein parameters comprised in the first parameter set are all parameters of parameter values acquired for the target scene and include parameters whose parameter values are zero, and the parameter values of the first parameter value set correspond to the parameters of the first parameter set;
- a control scene determination unit 702, configured for selecting one predefined scene from at least one predefined scene as a control scene in response to the at least one predefined scene existing, wherein the control scene has a parameter subset, and the parameter subset is a subset of the first parameter set of the target scene;
- a parameter value subset generation unit 703, configured for generating a parameter value subset of the target scene according to the parameter subset of the control scene, wherein parameter values of the parameter value subset correspond to parameters of the parameter subset, and the parameter value subset is a subset of the first parameter value set; and
- a security level determination unit 704, configured for determining a target security level of the target scene according to the parameter subset and the parameter value subset.

Optionally, the security level determination unit 704 is specifically configured for:
- determining a parameter security level corresponding to each parameter of the parameter subset according to value ranges of each parameter of the parameter subset corresponding to different security levels and the parameter values of the parameter value subset; and
- determining the target security level of the target scene according to the parameter security level.

Optionally, the apparatus further comprises: a predefined scene library construction unit 705 configured for:
- for each predefined scene,
- determining a second parameter set of the predefined scene according to values of each parameter of the predefined scene, wherein parameters comprised in the second parameter set are all parameters of parameter values acquired for the predefined scene and include parameters whose parameter values are zero;
- determining a parameter subset of the predefined scene from the second parameter set according to the importance degree of each parameter of the predefined scene; and
- determining value ranges of each parameter of the parameter subset corresponding to different security levels according to the second parameter value set and the parameter value subset, wherein the parameter values of the second parameter value set correspond to the parameters of the second parameter set, and the parameter values of the parameter value subset correspond to the parameters of the parameter subset.

Optionally, the predefined scene library construction unit 705 is specifically configured for:
- determining the parameter subset of the predefined scene from the second parameter set according to a first importance degree corresponding to each parameter of the predefined scene, wherein the first importance degree is determined according to historical road measured data or historical simulation data; or
- determining the parameter subset of the predefined scene from the second parameter set according to a second importance degree corresponding to each parameter of the predefined scene, wherein the second importance degree is set according to an empirical value.

Optionally, the predefined scene library construction unit 705 is further specifically configured for:
- determining a second parameter set of the predefined scene according to values of each parameter in the historical road measured data or the historical simulation data of the predefined scene;
- determining a first parameter subset from the second parameter set according to a first importance degree corresponding to each parameter of the predefined scene, wherein the first importance degree is determined according to historical road measured data or historical simulation data; and
- determining the parameter subset of the predefined scene from the first parameter subset according to a second importance degree corresponding to each parameter of the first parameter subset, wherein the second importance degree is set according to an empirical value.

Optionally, the predefined scene library construction unit 705 is further specifically configured for:

in response to the fact that at least two parameters existing in the predefined scene are non-unicity parameters, determining a reference parameter from the at least two parameters according to importance degrees of the at least two parameters on driving security of the predefined scene, wherein a parameter value of the non-unicity parameter has a correlation with a parameter value of at least one parameter of the parameter subset;

determining a value range of the reference parameter at each security level according to historical road measured data, historical simulation data or empirical values; and determining value range(s) of the other non-unicity parameter(s) in the at least two parameters corresponding to each security level respectively according to the value range of the reference parameter corresponding to each security level.

Optionally, the security level determination unit 704 is further configured for:

in response to the fact that no predefined scene with a similarity between the predefined scene and the target scene being larger than a set similarity threshold exists in the predefined scene, determining a preset security level as the target security level of the target scene.

Optionally, the predefined scene library construction unit 705 is further configured for:

in response to the fact that no predefined scene with a similarity between the predefined scene and the target scene being larger than a set similarity threshold exists in the predefined scene, adding the target scene to the predefined scene library, and determining a second parameter set, a second parameter value set, a parameter subset and a parameter value subset of the target scene in combination with the step of "constructing the predefined scene library."

The apparatus may be configured for executing the methods described in the embodiments shown in FIG. 3 to FIG. 6, and therefore, for functions and the like that can be implemented by each functional module of the apparatus, reference can be made to the description of the embodiments shown in FIG. 3 to FIG. 6, which is not repeated here. It shall be noted that the functional units shown by the dashed boxes in FIG. 7 are unnecessary functional units of the apparatus.

Figure 8:
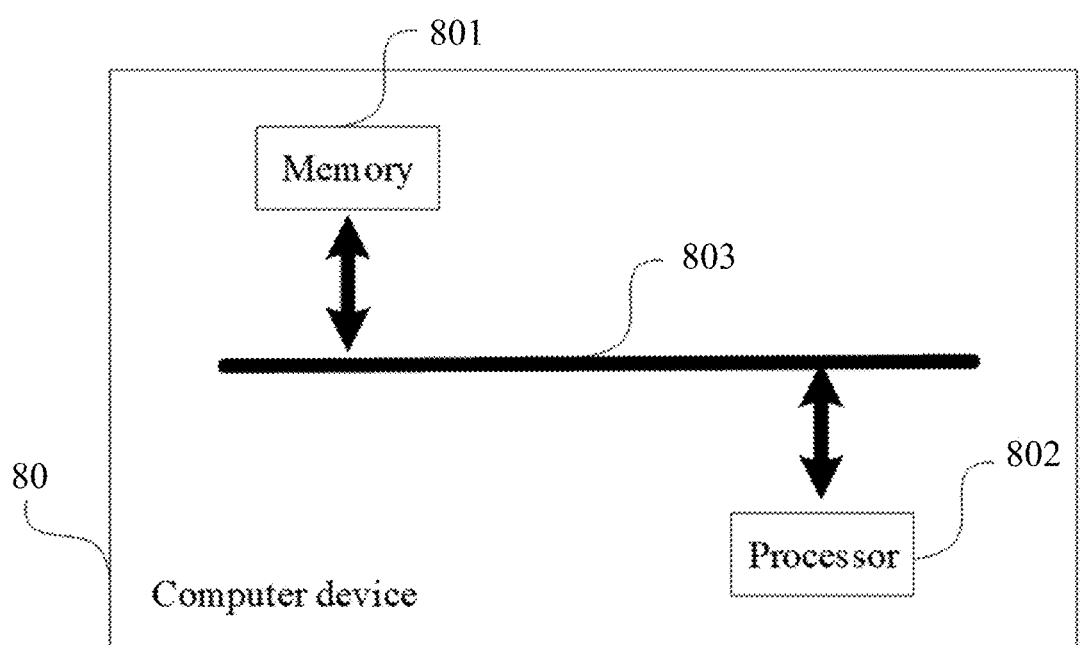
FIG. 8 is a schematic structural diagram of a computer device provided in an embodiment of the present application.

Referring to FIG. 8, based on the same technical concept, the embodiment of the present application further provides a computer device 80, which may comprise a memory 801 and a processor 802.

The memory 801 is used for storing computer programs executed by the processor 802. The memory 801 may mainly comprise a storage program area and a storage data area, wherein the storage program area can store an operating system, an application program required for at least one function, and the like; the storage data area can store data created from use of the computer device, and the like. The processor 802 may be a central processing unit (CPU), a digital processing unit, or the like. A specific connection medium between the memory 801 and the processor 802 is not limited in the embodiment of the present application. In the embodiment of the present application, the memory 801 and the processor 802 are connected by a bus 803 as shown in FIG. 8, the bus 803 is shown by a thick line in FIG. 8, and the connection manner between other components is only schematically illustrated and not limited. The bus 803 may be divided into an address bus, a data bus, a control bus and the like. For ease of illustration, only one thick line is shown in FIG. 8, but that does not indicate that there is only one bus or one type of bus.

The memory 801 may be a volatile memory, such as a random-access memory (RAM); the memory 801 may also be a non-volatile memory, such as, but not limited to, a read-only memory, a flash memory, a hard disk drive (HDD) or a solid-state drive (SSD), or the memory 801 may be any other medium that can be used to carry or store desired program code in the form of instructions or data structures and that can be accessed by a computer. The memory 801 may be a combination of the memories described above.

The processor 802 is used for implementing the method executed by the device in the embodiments as shown in FIG. 3 to FIG. 6 when calling the computer program stored in the memory 801.

In some possible embodiments, various aspects of the method provided in the present application may also be implemented in the form of a program product comprising the program code, wherein the program code is used for implementing the steps of the methods by the computer device according to various exemplary embodiments of the present application described above in this specification when the program product is run on the computer device, for example, the computer device may implement the methods as described in the embodiments shown in FIG. 3 to FIG. 6.

Those of ordinary skill in the art may understand that, all or part of the steps of implementing the above method embodiments may be implemented by hardware related to program instructions, and the above program may be stored in a computer-readable storage medium, and when executed, implements the steps including the above method embodiments; and the above storage medium includes various media capable of storing program codes, such as a mobile storage device, a read-only memory (ROM), a random access memory (RAM), a magnetic disk or an optical disk. Or, the integrated unit of the present invention may be also stored in a computer-readable storage medium if it is implemented in the form of a software functional module and sold or used as a separate product. Based on such understanding, the technical solutions of the embodiments of the present invention or portions thereof contributing to the prior art may be embodied in the form of a software product which is stored in a storage medium and includes several instructions for enabling a computer device (which may be a personal computer, a server or a network device) to execute all or part of the methods described in the embodiments of the present invention. The above storage medium includes media capable of storing program codes, such as a mobile storage device, a ROM, a RAM, a magnetic disk or an optical disk.

While the preferred embodiments of the present application have been described, additional variations and modifications can be made to those embodiments by those skilled in the art once they learn of the basic inventive concepts. Therefore, it is intended that the appended claims be interpreted as including the preferred embodiment and all variations and modifications that fall within the scope of the present application.

It will be apparent to those skilled in the art that various changes and modifications may be made to the present application without departing from the spirit and scope of the present application. Thus, if such modifications and variations of the present application fall within the scope of the claims of the present application and the equivalents thereof, the present application is intended to include such modifications and variations as well.

EXAMPLE CLAUSES

Embodiments of the disclosure can be described in view of the following clauses:

1. A scene security level determination method, comprising:
   determining, according to a first parameter set and a first parameter value set of a target scene where a target vehicle is located, whether at least one predefined scene exists in a predefined scene library, wherein a similarity between the at least one predefined scene and the target scene being larger than a set similarity threshold; wherein the first parameter set includes parameters whose values have been acquired for the target scene, and the first parameter value set includes parameter values which correspond to the parameters of the first parameter set;
   selecting, in response to the at least one predefined scene existing, one predefined scene from the at least one predefined scene as a control scene; wherein there is a parameter subset of the control scene, and the parameter subset of the control scene is a subset of the first parameter set of the target scene;
   generating, according to the parameter subset of the control scene, a parameter value subset of the target scene; wherein parameter values of the parameter value subset of the target scene correspond to parameters of the parameter subset of the control scene, and the parameter value subset of the target scene is a subset of the first parameter value set; and
   determining, according to the parameter subset of the control scene and the parameter value subset of the target scene, a target security level of the target scene.

2. The method according to clause 1, wherein the determining, according to the parameter subset of the control scene and the parameter value subset of the target scene, the target security level of the target scene comprises:
   for each parameter of the parameter subset, determining, according to value ranges of the parameter corresponding to different security levels and the parameter value of the parameter in the parameter value subset, a parameter security level corresponding to the parameter; and
   determining, according to the parameter security levels, the target security level of the target scene.

3. The method according to clause 1, further comprising:
   constructing a predefined scene library, wherein the predefined scene library comprises the at least one predefined scene, and the constructing the predefined scene library specifically comprises:
   for each predefined scene,
      determining, according to a value of each parameter acquired for the predefined scene, a second parameter set and a second parameter value set of the predefined scene; wherein the second parameter set includes the parameters whose values have been acquired for the predefined scene, and the second parameter value set includes values corresponding to the parameters in the second parameter set;
      determining, according to an importance degree of each parameter of the predefined scene, a parameter subset of the predefined scene from the second parameter set; and
      determining, according to a parameter value subset of the predefined scene, value ranges of each parameter in the parameter subset of the predefined scene corresponding to different security levels, wherein the parameter value subset of the predefined scene includes values correspond to the parameters of the parameter subset of the predefined scene.

4. The method according to clause 3, wherein the determining, according to the importance degree of each parameter of the predefined scene, the parameter subset of the predefined scene from the second parameter set comprises:
   determining, according to a first importance degree corresponding to each parameter of the predefined scene, the parameter subset of the predefined scene from the second parameter set, wherein the first importance degree is determined according to historical road measured data or historical simulation data; or
   determining, according to a second importance degree corresponding to each parameter of the predefined scene, the parameter subset of the predefined scene from the second parameter set, wherein the second importance degree is set according to an empirical value.

5. The method according to clause 3, wherein the determining, according to the importance degree of each parameter of the predefined scene, the parameter subset of the predefined scene from the second parameter set comprises:
   determining, according to a first importance degree corresponding to each parameter of the predefined scene, a first parameter subset from the second parameter set, wherein the first importance degree is determined according to historical road measured data or historical simulation data; and
   determining, according to a second importance degree corresponding to each parameter of the first parameter subset, the parameter subset of the predefined scene from the first parameter subset, wherein the second importance degree is set according to an empirical value.

6. The method according to clause 3, wherein the determining, according to the parameter value subset of the predefined scene, value ranges of each parameter in the parameter subset of the predefined scene corresponding to different security levels comprises:
   in response to the fact that at least two parameters of the predefined scene are non-unicity parameters,
      determining, according to importance degrees of the at least two parameters on driving security of the predefined scene, a reference parameter from the at least two parameters, wherein a parameter value of the non-unicity parameters has a correlation with a value of at least one parameter in the parameter subset of the predefined scene;
      determining, according to historical road measured data, historical simulation data or empirical values, a value range of the reference parameter at each security level; and
      determining, according to the value range of the reference parameter at each security level, value ranges of other non-unicity parameters in the at least two parameters corresponding to each security level respectively.

7. The method according to clause 1, further comprising:
in response to the fact that no predefined scene exists in the predefined scene, wherein the similarity between the predefined scene and the target scene is larger than the set similarity threshold, determining a preset security level as the target security level of the target scene.

8. The method according to clause 1, further comprising:
in response to the fact that no predefined scene exists in the predefined scene, wherein the similarity between the predefined scene and the target scene is larger than a set similarity threshold, adding the target scene to the predefined scene library.

9. A scene security level determination apparatus, which comprises:
a similar scene determination unit, configured for determining, according to a first parameter set and a first parameter value set of a target scene where a target vehicle is located, whether at least one predefined scene exists in a predefined scene library, wherein a similarity between the at least one predefined scene and the target scene being larger than a set similarity threshold; wherein the first parameter set includes parameters whose values have been acquired for the target scene, and the first parameter value set includes parameter values which correspond to the parameters of the first parameter set;
a control scene determination unit, configured for selecting, in response to the at least one predefined scene existing, one predefined scene from the at least one predefined scene as a control scene; wherein there is a parameter subset of the control scene, and the parameter subset of the control scene is a subset of the first parameter set of the target scene;
a parameter value subset generation unit, configured for generating, according to the parameter subset of the control scene, a parameter value subset of the target scene; wherein parameter values of the parameter value subset of the target scene correspond to parameters of the parameter subset of the control scene, and the parameter value subset of the target scene is a subset of the first parameter value set; and
a security level determination unit, configured for determining, according to the parameter subset of the control scene and the parameter value subset of the target scene, a target security level of the target scene.

10. The apparatus according to clause 9, wherein the security level determination unit is specifically configured for:
for each parameter of the parameter subset, determining, according to value ranges of the parameter corresponding to different security levels and the parameter value of the parameter in the parameter value subset, a parameter security level corresponding to the parameter; and
determining, according to the parameter security levels, the target security level of the target scene.

11. The apparatus according to clause 9, wherein the apparatus further comprises a predefined scene library construction unit configured for:
for each predefined scene,
determining, according to a value of each parameter acquired for the predefined scene, a second parameter set and a second parameter value set of the predefined scene; wherein the second parameter set includes the parameters whose values have been acquired for the predefined scene, and the second parameter value set includes values corresponding to the parameters in the second parameter set;
determining, according to an importance degree of each parameter of the predefined scene, a parameter subset of the predefined scene from the second parameter set; and
determining, according to a parameter value subset of the predefined scene, value ranges of each parameter in the parameter subset of the predefined scene corresponding to different security levels, wherein the parameter value subset of the predefined scene includes values correspond to the parameters of the parameter subset of the predefined scene.

12. The apparatus according to clause 11, wherein the predefined scene library construction unit is specifically configured for:
determining, according to a first importance degree corresponding to each parameter of the predefined scene, the parameter subset of the predefined scene from the second parameter set, wherein the first importance degree is determined according to historical road measured data or historical simulation data; or
determining, according to a second importance degree corresponding to each parameter of the predefined scene, the parameter subset of the predefined scene from the second parameter set, wherein the second importance degree is set according to an empirical value.

13. The apparatus according to clause 11, wherein the predefined scene library construction unit is further specifically configured for:
determining, according to a value of each parameter in the historical road measured data or the historical simulation data of the predefined scene, the second parameter set of the predefined scene;
determining, according to a first importance degree corresponding to each parameter of the predefined scene, a first parameter subset from the second parameter set, wherein the first importance degree is determined according to historical road measured data or historical simulation data; and
determining, according to a second importance degree corresponding to each parameter of the first parameter subset, the parameter subset of the predefined scene from the first parameter subset, wherein the second importance degree is set according to an empirical value.

14. The apparatus according to clause 11, wherein the predefined scene library construction unit is further specifically configured for:
in response to the fact that at least two parameters of the predefined scene are non-unicity parameters,
determining, according to importance degrees of the at least two parameters on driving security of the predefined scene, a reference parameter from the at least two parameters, wherein a parameter value of the non-unicity parameters has a correlation with a value of at least one parameter of the parameter subset of the predefined scene;

determining, according to historical road measured data, historical simulation data or empirical values, a value range of the reference parameter at each security level; and determining, according to the value range of the reference parameter at each security level, value ranges of other non-unicity parameters in the at least two parameters corresponding to each security level respectively.

15. The apparatus according to clause 11, wherein the security level determination unit is further configured for:

in response to the fact that no predefined scene exists in the predefined scene, wherein the similarity between the predefined scene and the target scene is larger than a set similarity threshold, adding the target scene to the predefined scene library.

16. The apparatus according to clause 9, wherein the security level determination unit is further configured for:

in response to the fact that no predefined scene exists in the predefined scene, wherein the similarity between the predefined scene and the target scene is larger than the set similarity threshold, determining a preset security level as the target security level of the target scene.

17. A device comprising a memory, a processor and a computer program stored on the memory and executable on the processor, wherein the processor, when executing the computer program, implements the method of any one of clauses 1~8.

18. A computer readable storage medium having a computer program instruction stored thereon, wherein the computer program instruction, when executed by a processor, implements the method of any one of clauses 1~8.

The invention claimed is:

1. A scene security level determination method, comprising:

determining, by a processor in a target vehicle according to a first parameter set and a first parameter value set of a target scene where the target vehicle is located, whether at least one predefined scene exists in a predefined scene library, wherein a similarity between the at least one predefined scene and the target scene being larger than a set similarity threshold; wherein the first parameter set includes parameters whose values have been acquired for the target scene, and the first parameter value set includes parameter values of the parameters in the first parameter set;

selecting, by the processor in response to the at least one predefined scene existing, one predefined scene from the at least one predefined scene as a control scene; wherein there is a parameter subset of the control scene, and the parameter subset of the control scene is a subset of the first parameter set of the target scene;

generating, by the processor according to the parameter subset of the control scene, a parameter value subset of the target scene; wherein the parameter value subset of the target scene includes values of parameters in the parameter subset of the control scene, and the parameter value subset of the target scene is a subset of the first parameter value set;

determining, by the processor according to the parameter subset of the control scene and the parameter value subset of the target scene, a target security level of the target scene; and causing, by the processor, the target vehicle to perform according to the target security level of the target scene;

wherein the method further comprises:

determining value ranges of each parameter in the parameter subset of the predefined scene corresponding to different security levels, comprising:

in response to the fact that at least two parameters in the parameter subset of the predefined scene are non-unicity parameters, determining, according to importance degrees of the at least two parameters on driving security of the predefined scene, a reference parameter from the at least two parameters;

determining a value range of the reference parameter at each security level; and determining, according to the value range of the reference parameter at each security level, value ranges of other non-unicity parameters in the at least two parameters corresponding to each security level respectively;

wherein the non-unicity parameters comprise at least two parameters in which if one of the at least two parameters meets a predetermined condition, the other parameter is classified into a same security category no matter how the other parameter changes.

2. The method according to claim 1, wherein the determining, according to the parameter subset of the control scene and the parameter value subset of the target scene, the target security level of the target scene comprises:

for each parameter of the parameter subset, determining, according to value ranges of the parameter corresponding to different security levels and the parameter value of the parameter in the parameter value subset, a parameter security level corresponding to the parameter; and determining, according to the parameter security levels, the target security level of the target scene.

3. The method according to claim 1, further comprising: constructing a predefined scene library, wherein the predefined scene library comprises the at least one predefined scene, and the constructing the predefined scene library specifically comprises:

for each predefined scene, determining, according to a value of each parameter acquired for the predefined scene, a second parameter set and a second parameter value set of the predefined scene; wherein the second parameter set includes the parameters whose values have been acquired for the predefined scene, and the second parameter value set includes values of the parameters in the second parameter set;

determining, according to an importance degree of each parameter of the predefined scene, a parameter subset of the predefined scene from the second parameter set; and determining, according to a parameter value subset of the predefined scene, the value range of each parameter in the parameter subset of the predefined scene corresponding to a security level, wherein the parameter value subset of the predefined scene includes values of the parameters in the parameter subset of the predefined scene.

4. The method according to claim 3, wherein the importance degree includes a first importance degree or a second importance degree, and the first importance degree is determined according to historical road measured data or historical simulation data, and the second importance degree is set according to an empirical value.

5. The method according to claim 3, wherein the importance degree includes a first importance degree and a second importance degree, and the determining, according to the importance degree of each parameter of the predefined scene, the parameter subset of the predefined scene from the second parameter set comprises:

determining, according to the first importance degree, a first parameter subset from the second parameter set, wherein the first importance degree is determined according to historical road measured data or historical simulation data; and determining, according to the second importance degree, the parameter subset of the predefined scene from the first parameter subset, wherein the second importance degree is set according to an empirical value.

6. The method according to claim 3, wherein the parameter value of the non-unicity parameters has a correlation with a value of at least one parameter in the parameter subset of the predefined scene;

the value range of the reference parameter at each security level are determined according to historical road measured data, historical simulation data or empirical values.

7. The method according to claim 1, further comprising:

in response to the fact that no predefined scene exists in the predefined scene library with a similarity above the similarity threshold with the target scene, determining a preset security level as the target security level of the target scene.

8. The method according to claim 1, further comprising:

in response to the fact that no predefined scene exists in the predefined scene library with a similarity above the similarity threshold with the target scene, adding the target scene to the predefined scene library.

9. The method according to claim 1, wherein the non-unicity parameters comprise inter-vehicle distance, a speed of the target vehicle, and a preceding vehicle speed.

10. A device comprising a memory, a processor and a computer program stored on the memory and executable on the processor, wherein the processor, when executing the computer program, implements a method comprising:

determining, by a process in a target vehicle according to a first parameter set and a first parameter value set of a target scene where a target vehicle is located, whether at least one predefined scene exists in a predefined scene library, wherein a similarity between the at least one predefined scene and the target scene being larger than a set similarity threshold; wherein the first parameter set includes parameters whose values have been acquired for the target scene, and the first parameter value set includes parameter values of the parameters in the first parameter set;

selecting, by the process in response to the at least one predefined scene existing, one predefined scene from the at least one predefined scene as a control scene; wherein there is a parameter subset of the control scene, and the parameter subset of the control scene is a subset of the first parameter set of the target scene;

generating, by the process according to the parameter subset of the control scene, a parameter value subset of the target scene; wherein the parameter value subset of the target scene includes values of parameters in the parameter subset of the control scene, and the parameter value subset of the target scene is a subset of the first parameter value set;

determining, by the process according to the parameter subset of the control scene and the parameter value subset of the target scene, a target security level of the target scene; and causing, by the processor, the target vehicle to perform according to the target security level of the target scene;

wherein the method further comprises:

determining value ranges of each parameter in the parameter subset of the predefined scene corresponding to different security levels, comprising:

in response to the fact that at least two parameters in the parameter subset of the predefined scene are non-unicity parameters, determining, according to importance degrees of the at least two parameters on driving security of the predefined scene, a reference parameter from the at least two parameters;

determining a value range of the reference parameter at each security level; and determining, according to the value range of the reference parameter at each security level, value ranges of other non-unicity parameters in the at least two parameters corresponding to each security level respectively;

wherein the non-unicity parameters comprise at least two parameters in which if one of the at least two parameters meets a predetermined condition, the other parameter is classified into a same security category no matter how the other parameter changes.

11. The device according to claim 10, wherein the determining, according to the parameter subset of the control scene and the parameter value subset of the target scene, the target security level of the target scene comprises:

for each parameter of the parameter subset, determining, according to value ranges of the parameter corresponding to different security levels and the parameter value of the parameter in the parameter value subset, a parameter security level corresponding to the parameter; and determining, according to the parameter security levels, the target security level of the target scene.

12. The device according to claim 10, wherein the method further comprises: constructing a predefined scene library, wherein the predefined scene library comprises the at least one predefined scene, and the constructing the predefined scene library specifically comprises:

for each predefined scene, determining, according to a value of each parameter acquired for the predefined scene, a second parameter set and a second parameter value set of the predefined scene; wherein the second parameter set includes the parameters whose values have been acquired for the predefined scene, and the second parameter value set includes values of the parameters in the second parameter set;

determining, according to an importance degree of each parameter of the predefined scene, a parameter subset of the predefined scene from the second parameter set; and determining, according to a parameter value subset of the predefined scene, the value range of each parameter in the parameter subset of the predefined scene corresponding to a security level, wherein the parameter value subset of the predefined scene includes values of the parameters in the parameter subset of the predefined scene.

13. The device according to claim 12, wherein the importance degree includes a first importance degree or a second importance degree, and the first importance degree is determined according to historical road measured data or historical simulation data, and the second importance degree is set according to an empirical value.

14. The device according to claim 12, wherein the importance degree includes a first importance degree and a second importance degree, and the determining, according to the importance degree of each parameter of the predefined scene, the parameter subset of the predefined scene from the second parameter set comprises:
   determining, according to the first importance degree, a first parameter subset from the second parameter set, wherein the first importance degree is determined according to historical road measured data or historical simulation data; and
   determining, according to the second importance degree, the parameter subset of the predefined scene from the first parameter subset, wherein the second importance degree is set according to an empirical value.

15. The device according to claim 12, wherein the parameter value of the non-unicity parameters has a correlation with a value of at least one parameter in the parameter subset of the predefined scene; and
   the value range of the reference parameter at each security level are determined according to historical road measured data, historical simulation data or empirical values.

16. A non-transitory computer readable storage medium having a computer program instruction stored thereon, wherein the computer program instruction, when executed by a processor, implements a method comprising:
   determining, by a processor in a target vehicle according to a first parameter set and a first parameter value set of a target scene where the target vehicle is located, whether at least one predefined scene exists in a predefined scene library, wherein a similarity between the at least one predefined scene and the target scene being larger than a set similarity threshold; wherein the first parameter set includes parameters whose values have been acquired for the target scene, and the first parameter value set includes parameter values of the parameters in the first parameter set;
   selecting, by the processor in response to the at least one predefined scene existing, one predefined scene from the at least one predefined scene as a control scene; wherein there is a parameter subset of the control scene, and the parameter subset of the control scene is a subset of the first parameter set of the target scene;
   generating, by the processor according to the parameter subset of the control scene, a parameter value subset of the target scene; wherein the parameter value subset of the target scene includes values of parameters in the parameter subset of the control scene, and the parameter value subset of the target scene is a subset of the first parameter value set;
   determining, by the processor according to the parameter subset of the control scene and the parameter value subset of the target scene, a target security level of the target scene; and
   causing, by the processor, the target vehicle to perform according to the target security level of the target scene; wherein the method further comprises:
   determining value ranges of each parameter in the parameter subset of the predefined scene corresponding to different security levels, comprising:
       in response to the fact that at least two parameters in the parameter subset of the predefined scene are non-unicity parameters,
           determining, according to importance degrees of the at least two parameters on driving security of the predefined scene, a reference parameter from the at least two parameters;
           determining a value range of the reference parameter at each security level; and
       determining, according to the value range of the reference parameter at each security level, value ranges of other non-unicity parameters in the at least two parameters corresponding to each security level respectively;
       wherein the non-unicity parameters comprise at least two parameters in which if one of the at least two parameters meets a predetermined condition, the other parameter is classified into a same security category no matter how the other parameter changes.

17. The medium according to claim 16, wherein the determining, according to the parameter subset of the control scene and the parameter value subset of the target scene, the target security level of the target scene comprises:
   for each parameter of the parameter subset,
       determining, according to value ranges of the parameter corresponding to different security levels and the parameter value of the parameter in the parameter value subset, a parameter security level corresponding to the parameter; and
       determining, according to the parameter security levels, the target security level of the target scene.

18. The medium according to claim 16, wherein the method further comprises: constructing a predefined scene library, wherein the predefined scene library comprises the at least one predefined scene, and the constructing the predefined scene library specifically comprises:
   for each predefined scene,
       determining, according to a value of each parameter acquired for the predefined scene, a second parameter set and a second parameter value set of the predefined scene; wherein the second parameter set includes the parameters whose values have been acquired for the predefined scene, and the second parameter value set includes values of the parameters in the second parameter set;
       determining, according to an importance degree of each parameter of the predefined scene, a parameter subset of the predefined scene from the second parameter set; and
       determining, according to a parameter value subset of the predefined scene, the value range of each parameter in the parameter subset of the predefined scene corresponding to a security level, wherein the parameter value subset of the predefined scene includes values of the parameters in the parameter subset of the predefined scene.

19. The medium according to claim 18, wherein the importance degree includes a first importance degree or a second importance degree, and the first importance degree is determined according to historical road measured data or historical simulation data, and the second importance degree is set according to an empirical value.

* * * * *